United States Patent [19]

Homma et al.

[11] Patent Number: 5,219,606
[45] Date of Patent: Jun. 15, 1993

[54] METHOD OF MANUFACTURING PHOSPHOR SCREEN FOR INTENSIFIER

[75] Inventors: Katsuhisa Homma, Kawasaki; Masaru Nikaido, Miura; Hiroshi Kubo; Tetsu Sano, both of Ootawara, all of Japan

[73] Assignee: Kabushiki Kaisha Toshiba, Kawasaki, Japan

[21] Appl. No.: 784,997

[22] Filed: Oct. 30, 1991

Related U.S. Application Data

[62] Division of Ser. No. 526,847, May 22, 1990, abandoned.

[30] Foreign Application Priority Data

May 23, 1989 [JP] Japan .................. 1-127905

[51] Int. Cl.$^5$ .............................................. B05D 5/06
[52] U.S. Cl. ............................ 427/65; 427/70; 427/71; 427/73; 427/226; 427/387; 427/419.1; 427/430.1
[58] Field of Search ................... 427/65, 70, 71, 73, 427/419.1, 430.1, 226, 387

[56] References Cited

U.S. PATENT DOCUMENTS 5,140,450 8/1992 Nikaido ......................... 359/82

Primary Examiner—Shrive Beck
Assistant Examiner—Benjamin L. Utech
Attorney, Agent, or Firm—Cushman, Darby & Cushman

[57] ABSTRACT

A method of manufacturing an output phosphor screen for x-ray image intensifier is disclosed. The method includes the steps of dropping a dispersion of infusible spherical silicon resin particles on a water surface to form an aggregate layer of the infusible spherical silicon resin particles on the water surface. Thereafter, the aggregate layer of infusible spherical silicon resin particles in adhered on a face plate. The adhered aggregate layer is the calcinated in an atmosphere containing oxygen at a temperature of not less than 500° C. to change the aggregate layer of infusible spherical silicone resin particles into a layer of spherical silica particles. A phosphor layer is then formed on the spherical silica particle layer.

4 Claims, 4 Drawing Sheets

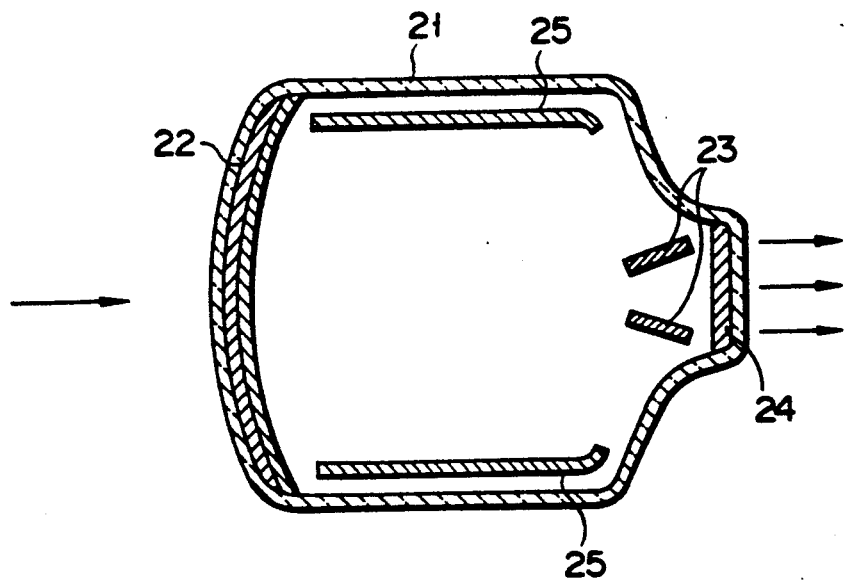
F I G. 5
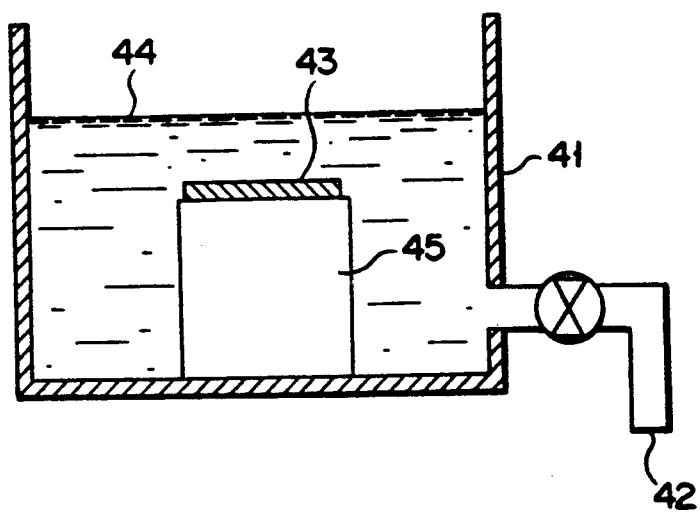
F I G. 6

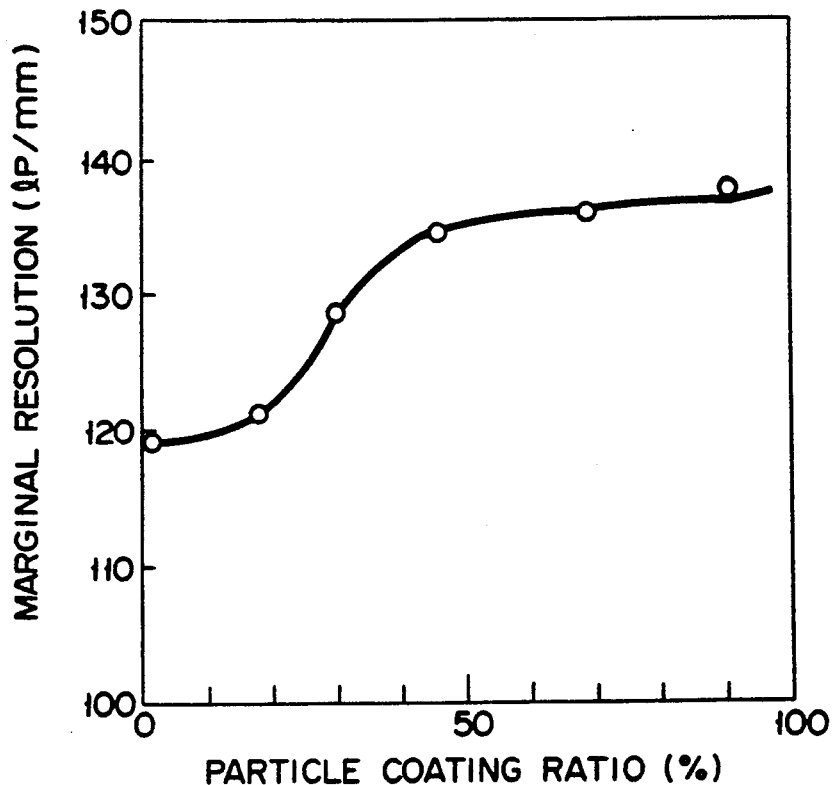
F I G. 7
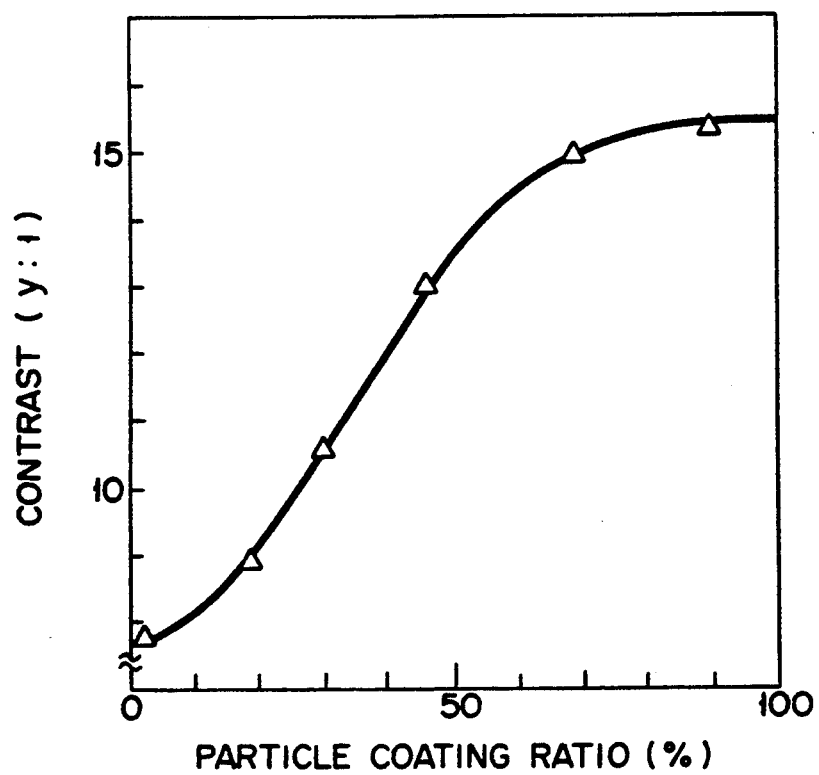
F I G. 8

METHOD OF MANUFACTURING PHOSPHOR SCREEN FOR INTENSIFIER

This is a division of application Ser. No. 07/526,847, filed May 22, 1990 now abandoned.

BACKGROUND OF THE INVENTION

1. Field of the Invention

The present invention relates to a phosphor screen and a method of manufacturing the same and an X-ray image intensifier using the phosphor screen and, more particularly, to improvements in an output phosphor screen of an X-ray image intensifier.

2. Description of the Related Art

An X-ray image intensifier generally has a vacuum envelope, an input screen provided at an input side of the vacuum envelope, an output screen provided at its output side, and a focusing electrode provided along the side wall of the vacuum envelope. The output screen is constituted as shown in FIG. 1. That is, a phosphor layer 32 is formed on a face plate 31 consisting of a glass having polished upper and lower surfaces, and an aluminum layer 33 is formed as a metal back on the phosphor layer 32.

The phosphor layer 32 may be formed by a slurry coating method or an electrodeposition method by using a phosphor powder having a grain size of 1 to 3 $\mu$m, or by a deposition method by using such phosphor or a phosphor component. The former method is generally superior in luminance, and the latter method is generally superior in resolution.

Functions of the aluminum layer 33 are to reflect light emitted from a phosphor substance toward an electron beam source to increase a luminance on a phosphor screen, prevent charging of an output phosphor film 12 by an electron beam, and protect the output phosphor film 12 from an alkali atmosphere in a cathode ray tube. If the aluminum layer 33 is formed directly on the phosphor layer, a satisfactorily smooth aluminum layer cannot be easily obtained. For this reason, a nitrocellulose film is normally formed on a phosphor film first, and then an aluminum layer is formed thereon. Thereafter, a heat-treatment is performed to evaporate and remove nitrocellulose from gaps between aluminum molecules. The resultant aluminum layer is formed on the phosphor layer. The aluminum layer formed in this manner has good smoothness.

In such a conventional output phosphor screen, however, a part of light emitted from the phosphor layer is not output from the output phosphor screen but scattered in a lateral direction in the phosphor layer. This scattering or irregular reflection is a main cause of reduction in contrast and resolution of the output phosphor screen. This scattering phenomenon is shown in a schematic view of FIG. 2. As shown in FIG. 2, a phosphor is excited upon radiation of, e.g., an electron beam 35, and light emission occurs at a light-emitting point X of the phosphor. A part 37 of the emitted light is reflected by an interface 36 between a phosphor layer and a substrate and then reflected by an aluminum layer 33. The emitted light is scattered by repetition of this reflection, i.e., multiple reflection.

In order to prevent multiple reflection, the smoothness of a metal back may be reduced. If, however, the smoothness is reduced, the reflectivity of the metal back is reduced accordingly to reduce the luminance of the output phosphor screen. In addition, an effect of protecting the phosphor layer from the alkali atmosphere is also reduced.

Such a multiple reflection phenomenon also occurs on the input phosphor screen. As a means for preventing this phenomenon, Published Unexamined Japanese Patent Application No. 50-109662 discloses a technique for spreading glass beads all over a substrate and forming a phosphor layer on the obtained glass beads layer by deposition. Glass beads, however, have a low heat resistance, and it is difficult to form particles of glass beads. Therefore, this technique cannot be applied to the output screen.

As described above, it is difficult to obtain an output phosphor screen having satisfactory luminance, contrast, and resolution.

SUMMARY OF THE INVENTION

It is an object of the present invention to provide an improved output phosphor screen having satisfactory luminance, contrast, and resolution.

It is another object of the present invention to provide a method of manufacturing the above output phosphor screen.

It is still another object of the present invention to provide an X-ray image intensifier using the above output phosphor screen.

According to an aspect of the present invention, there is provided a phosphor screen comprising a face plate, a particle layer including aggregated particles and formed on the face plate, and a phosphor layer formed between the particles on the particle layer, wherein a refractive index of the particles is smaller than that of the phosphor layer.

According to another aspect of the present invention, there is provided an X-ray image intensifier comprising:
- a vacuum envelope;
- an input phosphor screen provided at an input side of the vacuum envelope;
- an output phosphor screen provided at an output side of the vacuum envelope and comprising: a face plate; a particle layer formed on the face plate and including aggregated particles having a refractive index smaller than that of the phosphor layer; and a phosphor layer formed on the particle layer; and
- a focusing electrode arranged along side walls of the vacuum envelope.

According to still another aspect of the present invention, there is provided a method of manufacturing a phosphor screen comprising the steps of dropping a dispersion of infusible silicone resin particles on a water surface to form an aggregate layer of the infusible silicone resin particles on the water surface, making the aggregate layer of the infusible silicone resin particles adhered on a face plate, calcinating the aggregate layer of the adhered infusible silicone resin particles in an oxygen atmosphere at a temperature of not less than 500° C. to change the aggregate layer of the infusible silicone resin particles into a spherical particle silica layer, and forming a phosphor layer on the spherical particle silica layer or between the particles.

The particles of the phosphor screen according to the present invention have a smaller refractive index than that of the phosphor to be formed thereon. Therefore, light emitted from a light-emitting point of the phosphor can be totally reflected by the particle surfaces, and the particles serve as an optical guide for externally outputting the reflected light from the phosphor screen through gaps between the particles. In addition, these particles have an effect of preventing light from being remotely diffused by multiple reflection between the face plate surface and the metal back. In this manner, diffusion of the emitted light in the phosphor screen can be prevented to improve a luminance, a resolution, and a contrast of the phosphor screen.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 is a schematic view showing an X-ray image intensifier according to the present invention;

FIG. 6 is a view showing a water tank used in an example of the present invention;

FIG. 7 is a graph showing a marginal resolution as a function of a face plate coating ratio obtained by particles; and FIG. 8 is a graph showing a contrast as a function of a face plate coating ratio obtained by particles.

DETAILED DESCRIPTION OF THE PREFERRED EMBODIMENTS

In order to prevent diffusion of light which causes reduction in resolution and contrast of a phosphor screen, the present inventors examined a method of forming a large number of projections having a uniform height in the order of submicrons or microns on the surface of a face plate at which a phosphor layer is to be formed and a method of dividing a phosphor layer into substantially, optically divided microregions.

More specifically, the present inventors found that it is effective to spread substantially spherical particles having a particle size of a submicron or several microns all over the surface of a face plate on which a phosphor layer is to be formed.

That is, on a phosphor screen of the present invention, a particle layer consisting of ceramic particles is formed on a face plate, and a phosphor layer is formed on the particle layer. The particles have a smaller refractive index than that of the phosphor layer.

In order to obtain a uniform coating state of the particles throughout the surface, the particle sizes of the above particles are preferably uniform as precise as possible and the particle intervals are preferably small.

Since a phosphor film thickness is normally 0.5 to 2.0 μm, the particle size of the particles preferably falls within the range of 0.5 to 3 μm. This particle size range is effective to substantially, optically divide a phosphor film into microregions.

In order to obtain uniformity of the film, the sphericity of the particles is preferably 0.8 or more. Sphericity $f$ of the particles is represented by the following equation (1):

$$f = \frac{\sqrt{A/(\pi/4)}}{D_{max}} \quad (1)$$

where A is the sectional area of a particle and $D_{max}$ is the longest diameter of the section.

Although it is assumed that the spherical particle layer is preferably a single layer in order to suppress reduction in transmittance of light caused by formation of the particle layer, it may be a plurality of layers. The thickness of the particle layer is preferably 0.5 to 3.0 μm.

Examples of the particle are ceramics such as $SiO_2$, $Al_2O_3$, $TiO_{2-x}$, and $ZrO_{2-x}$ ($0 \leq x < 2$).

The present invention will be described in detail below with reference to the accompanying drawings.

Figure 1:
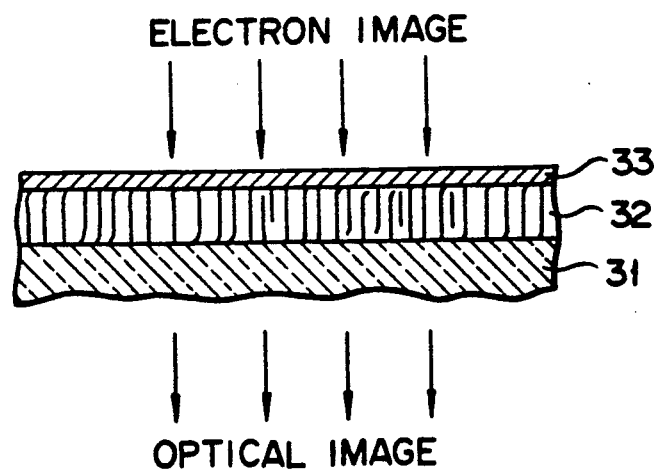
FIG. 1 is a sectional view showing a conventional phosphor screen.
Figure 2:
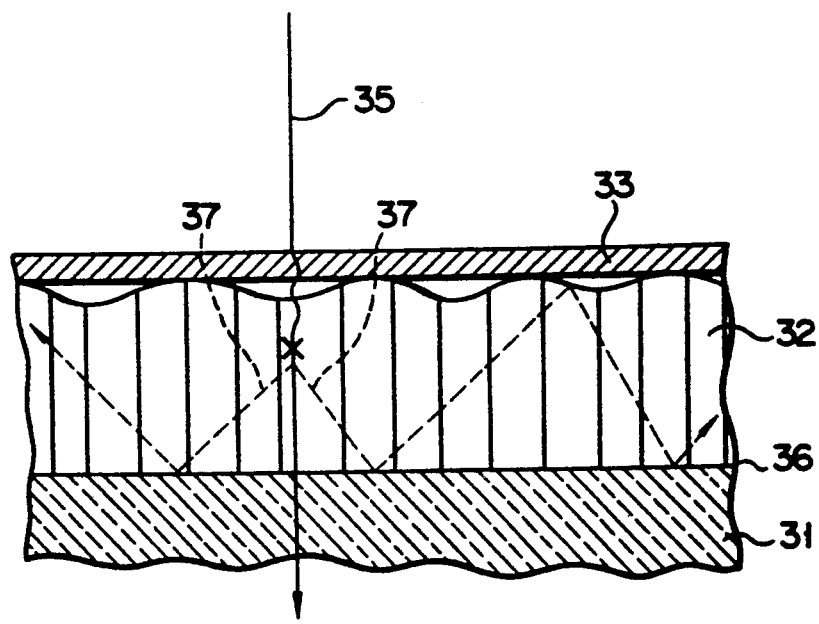
FIG. 2 is a schematic view showing diffusion of light in the conventional phosphor screen.
Figure 3:
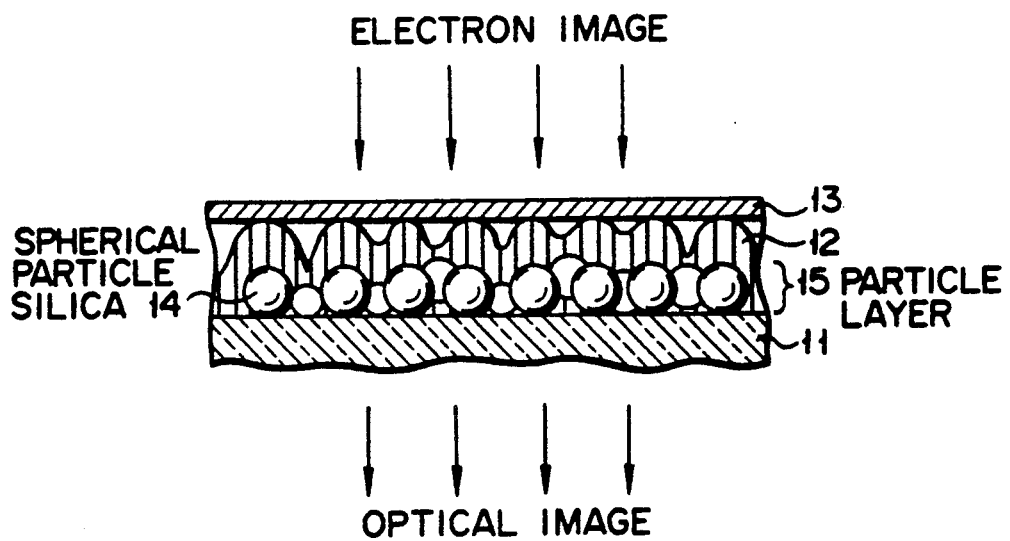
FIG. 3 is a sectional view showing a phosphor screen according to the present invention.

FIG. 3 is a sectional view showing a phosphor screen according to the present invention. A particle layer 15 substantially consisting of particles 14 is formed on a face plate 11, and a phosphor layer 12 is formed on the particle layer 15.

According to the phosphor screen shown in FIG. 3, since the particle layer is formed between the face plate 11 and the phosphor layer 12, substantially the same effect as an effect of finely and uniformly roughening the face plate surface can be obtained. For example, the phosphor layer 12 is formed on the particle layer 15 consisting of the particles 14 and substantially having a layered structure and also in the recesses and gaps formed on or between the particles 14. The phosphor layer formed between the particles is substantially divided into microregions by the particles 14.

Figure 4:
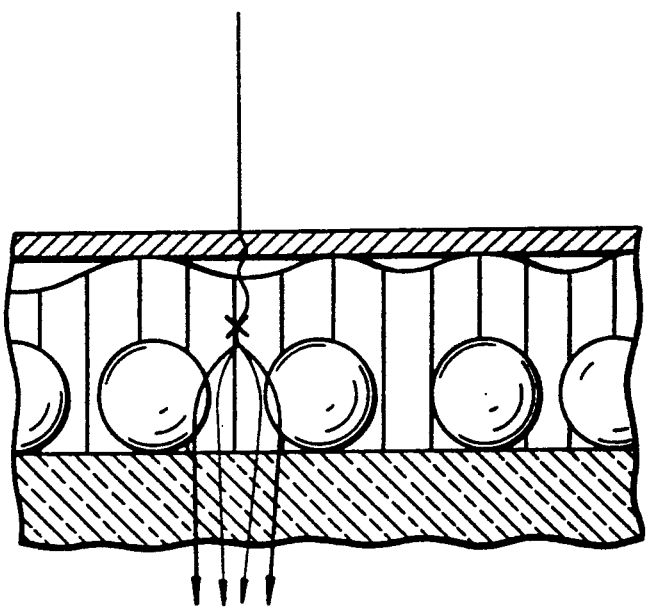
FIG. 4 is a schematic view showing an example of a light path in the phosphor screen according to the present invention.

FIG. 4 schematically shows light emission in the phosphor screen according to the present invention. As shown in FIG. 4, phosphor light 10 is emitted from a point X in the phosphor layer 12. A refractive index of the particles 14 such as silica is about 1.5, i.e., smaller than a refractive index of about 2.4 of the phosphor layer 12 such as a ZnS layer. Therefore, the emitted light 10 is totally reflected by the surfaces of the particles 14 with a comparatively high ratio, focused in the microregions divided by the particles, and output through the face plate. Therefore, the refractive index of the particles is smaller than that of the phosphor layer. Note that the effect of preventing diffusion of phosphor light caused by multiple reflection between the face plate and the metal back can be obtained regardless of the refractive index.

In the phosphor screen shown in FIG. 3, a possibility that the light emitted from the phosphor is diffused substantially parallel to the face plate surface beyond the projections or through the gaps formed by the particles 14 or is irregularly reflected is low. It is assumed that the entire phosphor layer 12 is substantially optically divided into microregions by the particles 14. Therefore, multiple reflection occurring between the interface between the face plate and the phosphor screen and the aluminum layer can be suppressed to improve a contrast and a resolution.

In the above description, the particles are larger than the phosphor particles in the phosphor screen. When the phosphor layer is to be formed by a slurry coating method or the like by using a phosphor powder, the particles are sometimes smaller than the phosphor particles. In this case, it is difficult to expect the effect of optically dividing the phosphor layer into microregions, but the effect of preventing multiple reflection can be expected.

In addition, since the phosphor particles and the substrate are substantially not brought into direct contact with each other, a phenomenon in which light emitted from the phosphor is totally reflected by an interface between the phosphor and the face plate can be suppressed. This total reflection occurs when the refractive index of the phosphor is larger than that of the face plate and the phosphor and the face plate ar in contact with each other.

FIG. 5 schematically shows an X-ray image intensifier comprising the phosphor screen shown in FIG. 3. As shown in FIG. 5, an input phosphor screen 22 is provided at an input side of a vacuum envelope 21, an output phosphor screen 24 as shown in FIG. 3 is provided at its output side, and a focusing electrode 25 is arranged along its side walls.

A method of manufacturing the phosphor screen according to the present invention will be described below. In this method, spherical particle silica is used as particles, and substantially one or two layers of the particle silica are coated on a face plate.

First, an infusible silicone resin such as polymethylsylseskioxane (TOSPAL (trademark) available from Toshiba Silicone K.K.) as a spherical silicone resin which is hydrophobic and has a specific gravity of about 1.3 is dispersed in a suitable dispersion medium, e.g., ethyleneglycol (containing small amounts of water and ammonium) to prepare a dispersion. The prepared dispersion is dropped in water to form an aggregate film, which consists of the infusible silicone resin particles and is an substantially single and uniform layer, on the water surface. The aggregate film is adhered on the face plate surface. The face plate having the aggregate film adhered thereon is naturally dried and calcined in air or an oxygen atmosphere at a temperature of 500° C. or more and preferably 700° C. to 1,000° C. to change the infusible silicone resin aggregate layer into a spherical silica particle layer. As a result, an uniform and substantially single particle layer substantially consisting of the spherical silica particles is formed on the face plate. If the calcinating temperature is at 500° C. or less, oxidation of the silicone resin is not sufficiently performed. Therefore, the silicone resin may not be changed into silica but remain on the face plate with high possibility. A phosphor such as a host material, ZnS phosphor is deposited on the particle layer and heat-treated in an inert gas atmosphere in order to activate the phosphor. As a result, a phosphor screen is obtained.

Note that the infusible silicone resin particle is not limited to polymethylsylseskioxane. The above infusible silicone resin particles may be produced by granulating polyorganosiloxane having three-dimensional network with siloxane bonding. Organic radical bonding to silicon atoms of polyorganosiloxane is substituted or unsubstituted univalent hydrocarbon radical, aliphatic hydrocarbon radical such as methyl or ethyl, aromatic hydrocarbon radical such as phenylene, or unsaturated hydrocarbon radical having vinyl radical.

That is, as the above infusible silicone resin, methylsilicone, ethylsilicone, vinylsilicone, phenylsilicone, and the like can be used.

A silicone resin is generally known as a silicone varnish obtained by dissolving a precondensate into a suitable solvent. In the present invention, the term "the infusible silicone resin particle" means an insoluble and infusible substance not containing a solvent but subjected to thermosetting.

In order to increase an adhesion strength between the particles and silica, an alkoxide of Si, Zr, and Al and the like can be used as an adhesive.

EXAMPLE 1

A water tank 41 as shown in FIG. 6 was prepared. The water tank 41 had an outlet 42 at a lower portion of its side wall, and a face plate fixing table 45 was provided on a central portion of its bottom. Water was filled in the water tank 41 to a level higher than the fixing table 45. As a face plate, a 40-mm diameter 1-mm thick quartz substrate 43 having optically polished and washed upper and lower surfaces was prepared. The quartz substrate 43 was fixed on the face plate fixing table 45.

About 15 to 16 wt % of silicone resin particles having an average particle size of 0.8 $\mu$m and a sphericity of about 0.9 were added to a dispersion medium mainly consisting of ethyleneglycol to prepare a slurry. The resultant slurry was sampled by a syringe and dropped on the water surface several times to form an aggregate layer consisting of infusible silicone resin particles. Thereafter, the water in the tank was gradually drained from the outlet 42 to lower the water level of a water surface 44. When the water level was lowered below the upper surface of the quartz substrate 43, an aggregate layer consisting of silicone resin particles was coated on the quartz substrate 43.

The substrate 43 coated with the particle aggregate layer was calcined in air at 900° C. for three hours to oxidize the silicone resin particles, thereby forming a particle layer consisting of the silica particles on the quartz substrate.

The states of the substrate surface before and after calcination of the substrate were measured by using a SEM. As a result, it was confirmed in each state that the particles were substantially uniformly distributed in a substantially single layer. Although a particle interval between the particles after calcination was slightly increased since the particle size was reduced to be smaller than that before calcination by 20% to 30%, even a maximum particle gap was about 1 $\mu$m or less. A rate of the area covered with the particle silica on the face plate (quartz substrate) was about 80% assuming that a rate obtained when the particles were most densely filled was 100%. The rate may be preferably not less than 50%.

As shown in FIG. 3, a phosphor layer 12 was formed on the particle layer 15 by using a deposition method. That is, ZnS as a host material and CuCl as an activator were charged in independent crucibles and evaporated in an Ar atmosphere at 0.5 Torr, thereby vapor-depositing the phosphor layer 12 on the particle layer formed on the quartz substrate. A molar ratio of the activator CuCl to the host material ZnS was about 1/1,000 to 1/500.

A nitrocellulose film was formed on the phosphor film 12 to obtain a smooth surface. A first aluminum layer was deposited on the nitrocellulose film to have a thickness of about 100 nm. After deposition, the resultant structure was heated at about 300° C. to evaporate and remove nitrocellulose. Thereafter, a second aluminum layer was deposited on the first aluminum layer to have a thickness of about 300 nm, thereby obtaining a phosphor screen as shown in FIG. 3.

Control 1

As a control, a phosphor layer was formed without depositing a particle layer 15 on a face plate and was heat-treated in an Ar atmosphere at 800° C. for three hours to diffuse and activate an activator. An aluminum layer was formed on the obtained phosphor layer following the same procedures as in Example 1 to form a phosphor screen. Note that the temperature was increased and decreased over three hours each upon the heat treatment.

Cathode rays were radiated on the two phosphor screens obtained by Example 1 and Control 1, and a cathode luminescence luminance, a resolution, and a contrast were evaluated. The results are summarized in Table 1.

The resolution was evaluated by an optical microscope having a magnification of 40 to 100 times by using a resolution chart. The contrast was evaluated, by using a circular shadow having an area corresponding to 10% of an effective surface area, as a cathode luminescence luminance ratio of an electron beam irradiated portion to a shadow portion.

TABLE 1

|  | Luminance | Marginal Resolution | Contrast |
| --- | --- | --- | --- |
| Example 1 | 102 cd/m$^2$ | 130 lp/mm | 15:1 |
| Control 1 | 99 cd/m$^2$ | 120 lp/mm | 8:1 |

| Evaluation Conditions |
| --- |
| Electron Beam Acceleration Voltage: 30 kV |
| Current Density: 0.01 μA/cm$^2$ |

As is apparent from Table 1, the contrast of the phosphor screen of the present invention was largely improved, and its marginal resolution was improved too. In addition, the cathode luminescence luminance of the phosphor screen of the present invention was substantially the same as that of Control 1. Therefore, when the phosphor screen of the present invention is used in an X-ray image intensifier, an improved image having a higher contrast and a higher resolution than those of conventional products can be obtained.

EXAMPLES 2 TO 6

Following the same procedures as in Example 1, phosphor screens having particle covering rates of 100%, 70%, 45%, 30%, and 20% (assuming that a rate obtained when the above particle silica was most densely covered as a single layer on the face plate described above is 100%) were manufactured by adjusting a drop amount of the above slurry and using a ZnS green phosphor. An average particle size of the particles was 0.8 μm, and the thickness of the phosphor layer was 1.5 μm. A marginal resolution and a contrast of each of the obtained phosphor screens were measured. FIGS. 7 and 8 are graphs showing the marginal resolution as a function of the particle coating ratio, and the contrast as a function of the particle coating ratio, respectively. As is apparent from FIGS. 7 and 8, a screen having a higher particle coating ratio has a higher marginal resolution and a higher contrast.

Additional advantages and modifications will readily occur to those skilled in the art. Therefore, the invention in its broader aspects is not limited to the specific details, representative devices, and illustrated examples shown and described herein. Accordingly, various modifications may by without departing from the spirit or scope of the general inventive concept as defined by the appended claims and their equivalents.

What is claimed is:

1. A method of manufacturing an output phosphor screen for an X-ray image intensifier comprising the steps of:

dropping a dispersion of infusible spherical silicone resin particles on a water surface to form an aggregate layer of said infusible spherical silicone resin particles on the water surface;

making said aggregate layer of spherical silicone resin particles adhered on a face plate;

calcinating said adhered aggregate layer of infusible spherical silicone resin particles in an atmosphere containing oxygen at a temperature of not less than 500° C. t change said aggregate layer of infusible spherical silicone resin particles into a layer of spherical silica particles; and forming a phosphor layer on said spherical particle silica layer.

2. A method according to claim 1, wherein said particle silica has an average particle size of 0.5 to 3.0 μm.

3. A method according to claim 1, wherein said phosphor has a refractive index of more than 1.5.

4. A method according to claim 1, wherein said infusible silicone resin is at least one member selected from the group consisting of methylsilicone, ethylsilicone, vinylsilicone, and phenylsilicone.

* * * * *